July 27, 1965 J. W. KAPPEN 3,197,224
PLATFORM TRUCK
Filed June 11, 1963 2 Sheets-Sheet 1
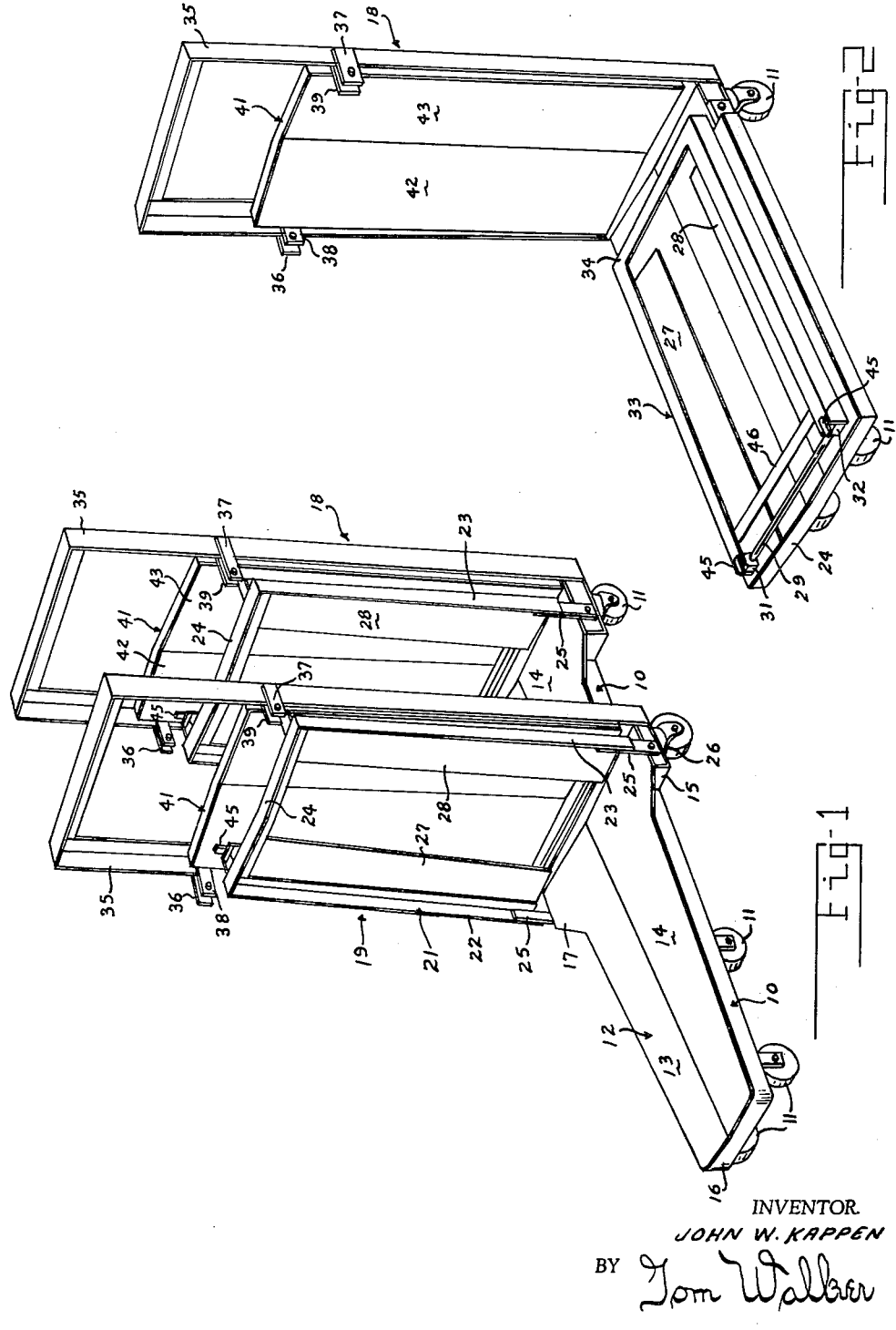
INVENTOR.
JOHN W. KAPPEN
BY Tom Walker
ATTORNEY

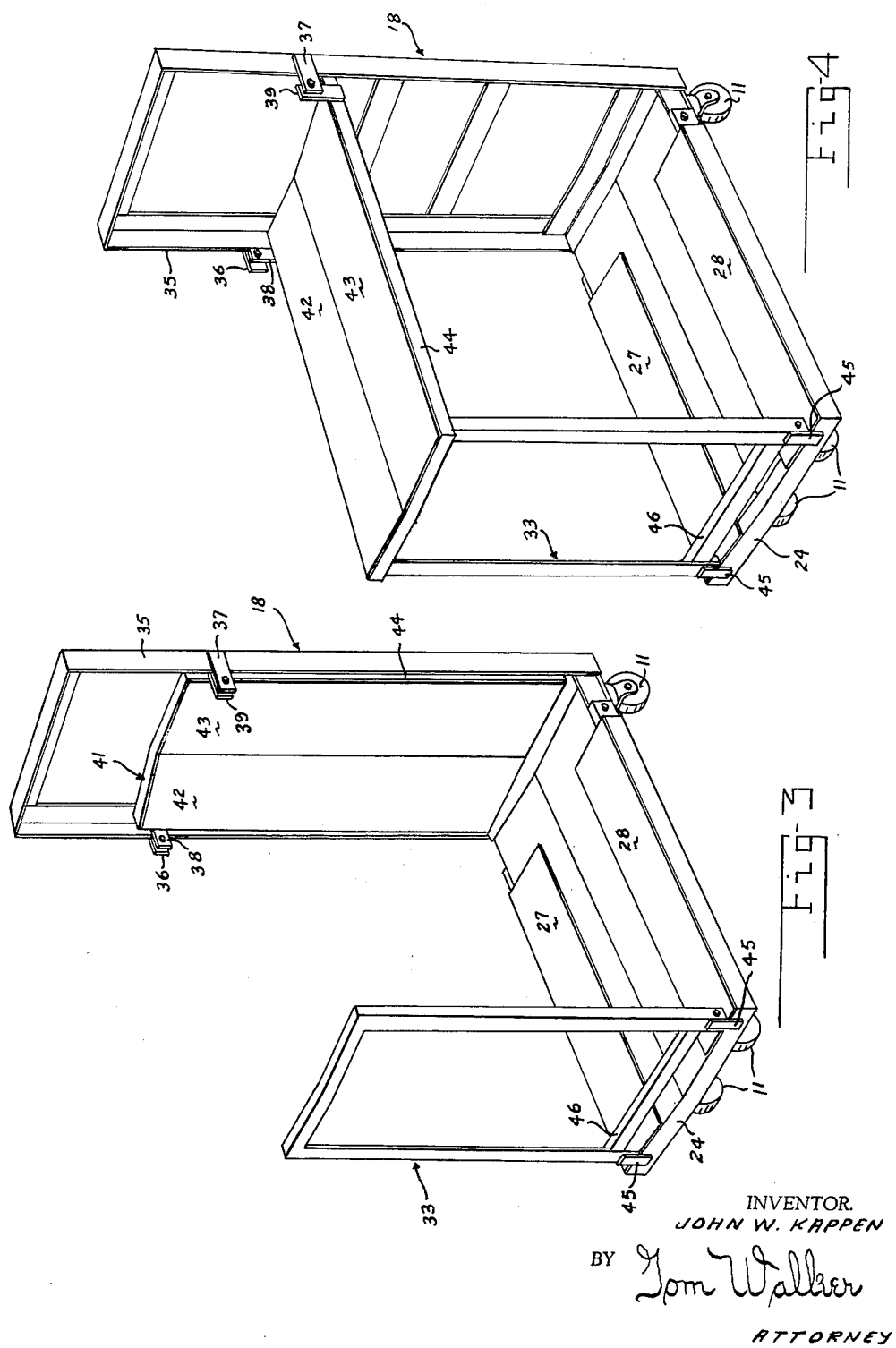

United States Patent Office 3,197,224
Patented July 27, 1965

3,197,224
PLATFORM TRUCK
John W. Kappen, 243 Kenwood Ave., Dayton, Ohio;
Frieda E. Kappen, administratrix of the estate of said
John W. Kappen, deceased
Filed June 11, 1963, Ser. No. 287,052
13 Claims. (Cl. 280—36)

This invention relates to the art of material handling, and particularly to hand trucks of the nesting type.

Trucks of the class described customarily are based on a design compromise. Thus it is desirable to build into the truck a large load carrying capacity. However, this objective can be achieved in only a limited way within nesting requirements calling for a truck bed of slim, tapered configuration.

The object of the invention is to simplify the construction as well as the means and mode of operation of hand trucks, whereby such trucks may not only be economically manufactured, but will be more efficient and satisfactory in use, adaptable to a wide variety of application, and be unlikely to get out of order.

A further object of the invention is to provide a truck adapted for nesting yet incorporating a relatively large load carrying capacity.

Another object of the invention is to increase the load carrying capacity of a hand truck as described while retaining its capability of interfitting or nesting with other like trucks.

A further object of the invention is to introduce a principle of convertibility into hand trucks as described, whereby a simple truck adapted for nesting may be converted into a multi-level platform truck of large load carrying capacity.

Still another object of the invention is to provide a convertible truck as described wherein adjustable platform elements have a connected, integrated relation to the truck and are self-storing when not in use.

A further object of the invention is to provide a hand truck possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a view in perspective, showing nested hand trucks in accordance with the illustrated embodiment of the invention;

FIG. 2 is a view like FIG. 1, showing a single truck in a first stage of converting to a platform truck;

FIG. 3 is a view like FIG. 2, showing the truck in a second converting stage; and FIG. 4 is a view like FIGS. 2 and 3, showing the final converting stage.

Like parts are indicated by similar characters of reference throughout the several views.

Referring to the drawings, the invention is disclosed in connection with a hand truck useful in a goods distribution system wherein a plurality of unloaded trucks may be grouped in a nested relation in the interests of greater compactness and ease of handling for return to a warehouse, stock room or place of origin of the goods conveyed thereon.

In its illustrated embodiment the truck comprises a strong and rigid frame 10 to the underside of which is mounted wheels 11, so installed and of such character as to give frame 10 ample support and to give it a freely rolling character. Overlying the frame 10 and suitably secured thereto is a bed plate 12. The plate 12 is constructed to taper laterally toward the center thereof, there being in effect separate sides 13 and 14 inclining in opposite directions from the longitudinal axis of the plate. At what may be considered its inner or head end the frame 10 has outthrust portions 15. From such outthrust portions toward the opposite or outer end thereof the frame 10 has a tapered configuration, terminating at such outer end in a nose portion 16 of relatively short width. The overlying bed plate 12 has a complementary configuration, wings 17 at the inner end thereof overlying the outthrust frame portions 15.

In addition, the arrangement of the wheels 11, and of related parts, is such as relatively to depress the outer end of the frame 16 and bed plate 12 thereon. The frame 10 and mounted bed plate thus are relatively higher at their inner or head ends than at their outer or nose ends. The arrangement is one adapting the truck to nesting whereby the nose end of one truck may be received by the head end of another truck, with the two being moved relatively to one another in an approaching sense until a closely telescoping relation is attained. As shown in FIG. 1, a truck 18 in accordance with the illustrated embodiment of the invention is in the process of achieving a nested relation with a like truck 19.

The bed plate 12 provides a load supporting surface for the stacking of goods to be carried. The V-like cross-sectional shape of the bed plate inclines the stacked goods toward the longitudinal axis of the plate, goods on opposite sides reacting against one another. The arrangement is one of increased stability and safety.

Selectively usable means to increase the load carrying capacity of the truck include a frame member 21 comprised of side channels 22 and 23, and, at one end thereof, a connecting cross-member 24. At their opposite ends the sides 22 and 23 are welded or otherwise secured to extension arms 25 mounted to pivot means 26 installed in the outthrust frame portions 15. Extending inwardly from each side 22 and 23 are load support plates 27 and 28. The frame 21 is adapted to occupy either the upright position shown in FIG. 1, wherein it extends approximately at right angles to the bed plate 12, or the lowered position shown in FIG. 2 wherein it rests on and overlies the bed plate. So positioned, the plates 27 and 28 of the frame 21 cooperate with the plate 12 in defining a load supporting platform, which, due to the more regular configuration of the frame and to its overlapping relation to the bed plate, has lateral dimensions exceeding those of the bed plate 12 proper.

At what may be considered its outer end, or that end occupied by cross member 24, the frame 21 mounts a cross shaft 29 in bearings 31 and 32. A generally U-shaped auxiliary frame 33 has its open end attached to opposite ends of the shaft 29 whereby to be pivotally connected to the outer end of frame 21. By virtue of its pivotal connection to the frame 21, auxiliary frame 33 is adapted to be folded thereon and to be relatively inversely disposed thereto, its opposite or closed end 34 extending toward the inner of open end of frame 21. With the supporting frame 21 lowered as shown in FIG. 2, the auxiliary frame 33 may be raised from its folded position to an erect position substantially as shown in FIG. 3. There it stands normal to the bed plate 12, at one end of the truck, in an opposing, facing relation to an upstanding stationary frame member 35 which may be considered to constitute the handle of the truck. Thus, the handle 35 similarly is U-shaped and at its open end embraces and is welded or otherwise secured to the frame 10.

Intermediate its upper and lower ends the handle 35 has inwardly projecting arms 36 and 37. To these are pivotally connected other arms 38 and 39 integral with another load supporting plate 41. This plate is similar to bed plate 12, having oppositely inclined sides 42 and 43, but is more nearly rectangular in configuration. By virtue of its pivotal connection to the fixed arms 36 and 37, the plate 41 normally hangs in a suspended relation substantially within or between side arms of the handle 35. To be put into use the plate 41 is raised by lifting on its lower end, rocking the plate about the supports 36 and 37, until it achieves a position substantially normal to the handle 35. There, in overlying, vertically spaced relation to the bed plate 12, the plate 41 serves as a second, higher level platform for the carrying of additional goods on the same truck. One end of the upper platform as defined by the plate 41 is supported through the hinged connection thereof to arms 36-37. The other, opposite end of the platform is adapted to interengage or rest on the upper end of auxiliary frame 33 which thus assumes the character of a support for the upper platform. Plate 41 has on three sides thereof a flange 44 to fit over the upwardly projecting end of frame 33. The latter is limited in its rocking motion to the upright position as shown in FIG. 3 by stops 45 thereon engageable with the cross-bar 24 of frame 21. A cross-member 46 reinforces and strengthens frame 33.

As may be observed, the elements contributing to the increased load carrying capacity of the truck are selectively usable and self-storing. The plate 41 is, as noted, substantially contained within and between the arms of handle 35. The frame 21 is pivotally connected to the frame 10 at a point adjacent to the handle 35, and, when raised to the nonoperating position of FIG. 1, is in a position adjacent to and generally parallel to handle 35 and plate 41. The arrangement is one to remove the elements of selective use rearwardly or away from bed plate 12 in such manner that no obstacle is presented to the free nesting or stacking of unloaded trucks.

Further, it will be understood that the truck of the invention may assume different structural forms in accordance with the requirements of use. In the form shown in FIG. 1, the device of the invention has the character of a simple hand truck, with plate 12 defining the bed or base thereof and the handle 35 a means to propel and move the truck about. Stored elements 21, 33 and 41 restrain stacked goods from endwise motion off the handle end of the truck. The truck is also useful in the form shown in FIG. 3 wherein frame 21 has been lowered on bed plate 12 and auxiliary frame 33 has been raised. Here a single platform truck of relatively increased lateral dimension is provided as well as a support, in the form of auxiliary frame 33, against endwise motion of the loaded goods from the outer end of the truck. The goods are in this instance confined at both ends of the truck. Finally, the truck is usable in the form shown in FIG. 4 wherein plate 41 has been raised and interengaged with auxiliary frame 33 to define an upper level for the stacking of additional goods.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A hand truck, including a generally rectangular bed portion adapted for nesting, an upright handle attached to said bed portion at one end thereof, a platform hinged to occupy alternatively an upright position adjacent to said handle and a lowered position of rest on said bed portion extending the dimensions thereof, said platform having an outer end which in the lowered position thereof is remote from said handle, and a member hinged to said platform at said outer end and adjustable to occupy an upright position relative thereto in opposing spaced relation to said handle.

2. A hand truck according to claim 1, characterized by another platform hinged to said handle at a location elevated relative to said bed and interengageable at its other end with said member.

3. A hand truck, including a generally rectangular bed portion adapted for nesting, an upright handle rigidly attached to said bed portion at one end thereof, a platform pivotally connected to said handle at a location elevated relative to said bed portion, said platform occupying normally a suspended position alongside said handle, another platform pivotally connected to said bed portion near said one end thereof and extending normally upward alongside said handle and the first said platform suspended therefrom, said other platform being adapted to be lowered to rest on said bed portion, the first said platform being adapted to be raised to occupy a vertically spaced overlying position relative to said bed portion, and means on said other platform adjustable in a lowered position of said other platform to a position to support the first said platform in the said raised overlying position thereof.

4. A hand truck according to claim 3, characterized in that said last named means comprise a handle-like portion pivotally connected to said other platform to occupy normally a folded position thereon and adjustable in the lowered position of said other platform to an upright position in opposed longitudinally spaced relation.

5. A hand truck, including a bed portion and an upwardly projecting handle attached thereto, a platform pivotally connected at its one end to said handle at a location vertically spaced from said bed portion, said platform tending to hang suspended from said location alongside said handle and being pivotally adjustable to a raised position overlying said bed portion and projecting outwardly of said handle, said platform having a generally rectangular configuration and in cross-section providing sides inclining in opposite directions from the longitudinal axis, said bed portion having a like-cross sectional shaped with inclining sides thereon being aligned with corresponding sides of said platform, and means for supporting said platform in said raised position.

6. A hand truck, including a bed portion providing longitudinally spaced apart ends, an upwardly extending handle rigidly attached to said bed portion at one end thereof, an elongate frame pivotally connected at an inner end thereof to said bed portion at said one end thereof and adapted to be adjusted to overlie said bed portions to extend lateral dimensions thereof, an outer end of said frame overlying the other end of said bed portion, said frame and said bed portion cooperating to define a platform, and means pivotally connected to said frame at the said outer end thereof adjustable to an upright position in opposing relation to said handle.

7. A platform truck, including a bed portion, longitudinally spaced uprights on said bed portion, one of said uprights being stationary relative to said bed portion, and an adjustable support for the other upright including a frame pivotally connected to said bed portion adjacent said one upright to occupy a stored position projecting upwardly alongside said one upright and being selectively lowered to overlie said bed portion, said other upright being pivotally connected to said frame to occupy a folded position thereagainst in the stored position of the frame and adjustable to an upwardly projecting position in the lowered position of the frame.

8. A platform truck according to claim 7, characterized by a platform member pivotally connected to said one upright to occupy a stored position suspended therefrom and adjustable to a raised position outstretched from said one upright and vertically spaced above said bed portion, said platform in its raised position being engageable by said other upright for support thereby.

9. A convertible nesting type hand truck, including a bed portion adapted for nesting with corresponding portions of other trucks, a handle rigidly attached to said bed portion and extending upright therefrom, and means for forming a platform elevated above said bed portion including platform and support elements occupying normally stored positions in adjacent parallel relation to said handle, said elements having a connected integrated relation to the truck.

10. A hand truck according to claim 10, characterized in that said handle and adjacent stored platform and support elements are located to one end of said bed portion to interpose no obstacle to nesting as described.

11. A platform truck, including a bed frame and plate thereon, an upright handle secured thereto, said handle including upwardly extending side arms, another plate pivotally connected to said handle to hang in a suspended position between said arms, a free end of said end plate extending downward in adjacent relation to said bed plate, and a support having a connected relation to said bed frame and plate in longitudinally spaced relation to said handle, said other plate being tiltable about its pivot to said handle to occupy an overlying spaced relation to said bed plate, the free end thereof being engageable with said support.

12. A platform truck according to claim 12, characterized by a carrier for said support pivotally connected to said bed frame and plate adjacent to said handle and adjustable to a stored position alongside said handle.

13. A convertible nesting type hand truck, including a bed portion of longitudinal tapered configuration, the narrower end thereof being depressed relative to the broader end, a handle rigidly attached to said bed portion at said broader end and extending upright therefrom, a platform occupying normally a stored position suspended from said handle, one end of said platform being pivotally connected to said handle, and a support for the other end of said platform including a first part pivotally mounted to occupy normally a stored position in upright parallel relation to said handle and to said platform, and further including a second part occupying a folded position upon said first part in a stored position, said platform and said support being when stored in an adjacent relation to said handle at said broader end of said bed portion to interpose no obstacle to nesting of one truck with another.

References Cited by the Examiner

UNITED STATES PATENTS 2,419,422   4/47   Schulein _____ 280—36
2,762,669   9/56   Watson _____ 280—36 X ARTHUR L. LA POINT, *Primary Examiner.*